United States Patent [19]

Ledford, Jr.

[11] 4,315,149

[45] Feb. 9, 1982

[54] MASS SPECTROMETER

[75] Inventor: Edward B. Ledford, Jr., Lincoln, Nebr.

[73] Assignee: The Board of Regents of the University of Nebraska, Lincoln, Nebr.

[21] Appl. No.: 152,613

[22] Filed: May 23, 1980

[51] Int. Cl.[3] ............................................ B01D 59/44

[52] U.S. Cl. .................................... 250/282; 250/288; 250/291

[58] Field of Search ............... 250/281, 282, 290, 291, 250/292, 288, 289, 457; 313/7

[56] References Cited

U.S. PATENT DOCUMENTS

Re. 26,392 5/1968 Craig et al. ........................ 250/288
2,724,056 11/1955 Slepian ............................... 250/291
3,500,040 3/1970 Padrta ................................ 250/288
3,742,212 6/1973 McIver ............................... 250/291
4,046,012 9/1977 Studenick ........................... 250/288

*Primary Examiner*—Bruce C. Anderson
*Attorney, Agent, or Firm*—Vincent L. Carney

[57] ABSTRACT

To increase the sample sensitivity of an ion cyclotron resonance mass spectrometer so that it can analyze small samples, the escape of molecules from an analyzer cell assembly is controlled by a loss reduction means. In the preferred embodiment, the loss reduction means encloses the analyzer cell. Molecular flow conductance tuning of the loss reduction means is used to maximize sensitivity of the detector for small sample sizes, and to balance loss of sample against the buildup of pyrolysis and beam fragmentation products within the loss reduction enclosure.

33 Claims, 4 Drawing Figures

MASS SPECTROMETER

The Government has rights in this invention pursuant to Contract Number CHE-77-03964 awarded by the National Science Foundation.

BACKGROUND OF THE INVENTION

This invention relates to ion cyclotron resonance mass spectrometers.

Ion cyclotron resonance mass spectrometers (ICR mass spectrometers) are known in which trapping potentials are applied to oppositely located electrodes of an analyzer cell to trap ions which are rotated by a magnetic field applied across the cell. Resonance is established for different ions based on their charge/-molecular weight ratio by applying an alternating electric field across the cell to impart kinetic energy to those ions resonant with the alternating field. The ions which are in resonance may be sensed by marginal oscillators, electroscopes, broad band balanced bridge means, or the like. These ion cyclotron resonance mass spectrometers operate in a high vacuum such as $10^{-7}$ torr.

In some ICR spectrometers, one-region analyzer cells are used, which have the source, analyzer and detector in the same region to perform their functions sequentially in time without changing location rather than being based on a sequence that occurs as the ions move to spatially separated locations, as in drift type analyzer cells.

In a prior art type of one-region ICR spectrometer such as that disclosed in U.S. Pat. No. 3,742,212 issued June 26, 1973, to McIver and U.S. Pat. No. 4,105,917 issued Aug. 8, 1978, to McIver and Ledford, the molecules of the sample are pulled from the analyzer cell by the fast pump that evacuates the main vacuum housing in which the one-region analyzer cell is mounted.

The prior art ion cyclotron resonance mass spectrometers have a disadvantage in that only a small portion of the sample is available for analysis, the remainder being drawn from the system without entering the analyzer cell or being too quickly removed from the analyzer cell by the vacuum pump.

SUMMARY OF THE INVENTION

Accordingly, it is an object of the invention to provide a novel ion cyclotron resonance mass spectrometer.

It is a further object of the invention to provide a novel method for analyzing samples.

It is a still further object of the invention to provide a novel method and apparatus for identifying molecular species.

It is a still further object of the invention to provide an ion cyclotron resonance mass spectrometer which has a high sensitivity with respect to sample size.

It is a still further object of the invention to provide a novel method and ion cyclotron resonance mass spectrometer which avoids spurious peaks which may arise in the course of analyzing small samples.

In accordance with the above and further objects of the invention, a one-region, ICR mass spectrometer is provided in which the sample is injected directly into the analyzer and detector region and the loss of neutral sample particles from the analysis region to the vacuum pump is controlled.

In one embodiment, the analyzer cell is substantially sealed, except for an electron beam aperture, so that sample injected into the sealed space is not lost quickly and provides a sufficiently long sample lifetime at a useful sample concentration. This permits certain types of analysis not heretofore possible in ICR mass spectrometry at a reasonable cost such as the identification of a wide range of different size molecules, identification of mixture components, and ultra specific trace analysis.

In another embodiment, the sealing is advantageously a glass envelope which surrounds the compartment formed by the electrodes of the analyzer cell and spaced from them. A tubular sample injector extends through the glass envelope to permit gas molecules to be inserted therein for passage directly into the region in the analyzer cell between the electrodes for analysis.

An adjustable opening provides control of molecular flow conductance from the analyzer region to the vacuum pump, and permits escape of sample to be balanced against the buildup of pyrolysis and electron beam fragmentation products or products resulting from other methods of ionization or sample evaporation. Glass lining reduces adsorption of the sample to the walls by permitting escape of such unwanted products.

The above noted and other features of the invention provide several advantages such as: (1) they permit the analysis of mixtures having a wider range of molecular species than possible with prior art ICR mass spectrometers; (2) they increase sample sensitivity while reducing spurious peaks arising from buildup of fragmentation, decomposition, or pyrolysis products in the mass spectrometer; (3) the losses of sample are reduced in the analyzer cell of an ICR mass spectrometer; and (4) they balance the loss of sample against the accumulation of other unwanted particles such as particles formed by pyrolysis of the heater in the electron gun or electron beam fragmentation.

SUMMARY OF THE DRAWINGS

The above noted and other features of the invention will be better understood from the following detailed description when considered with reference to the accompanying drawings in which.

DETAILED DESCRIPTION

Figure 1:
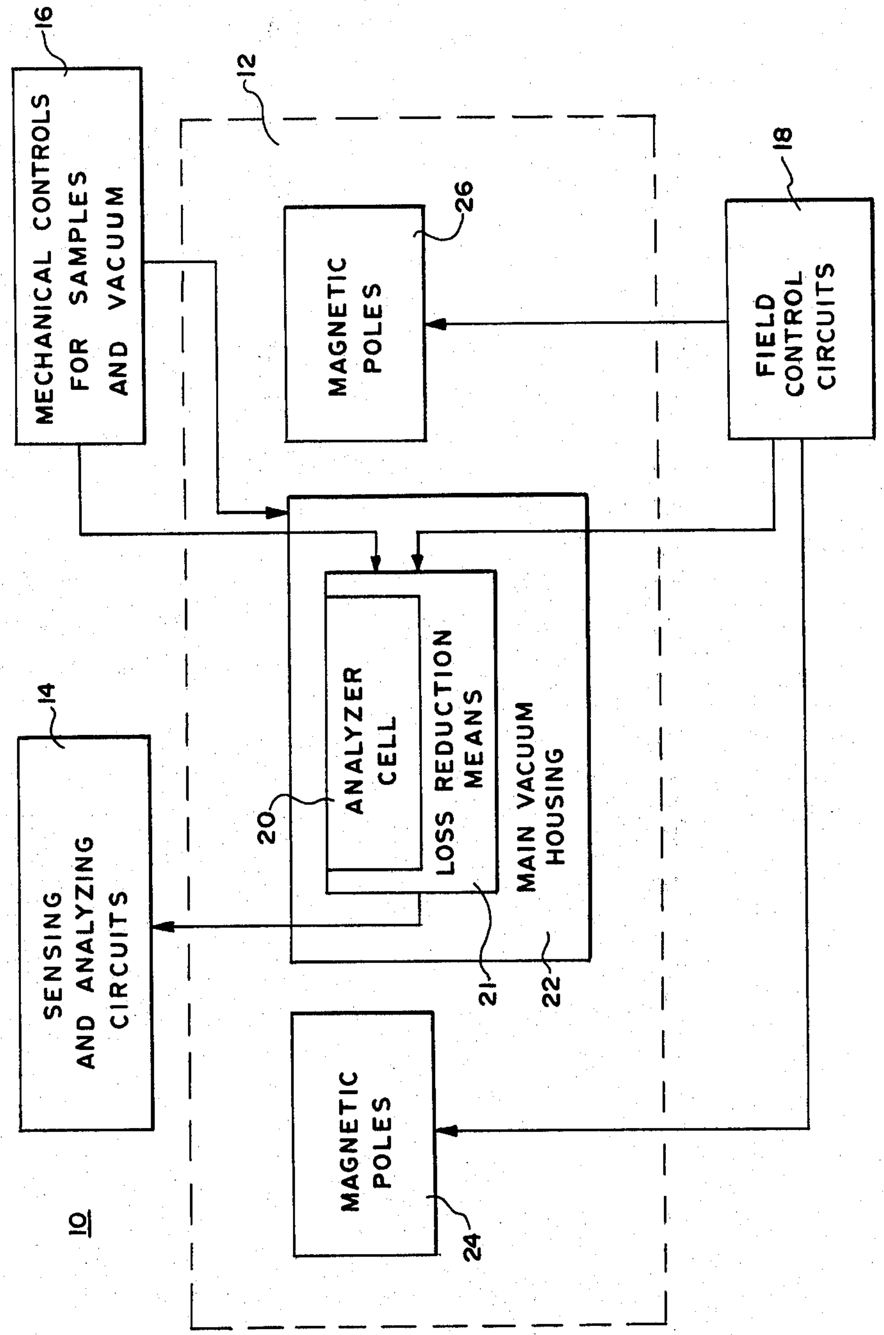
FIG. 1 is a block diagram of a mass spectrometer system including an embodiment of the invention.

In FIG. 1, there is shown a block diagram of an ICR mass spectrometer system 10 having an ICR mass spectrometer assembly shown generally at 12, sensing and analyzing circuits 14, mechanical controls for samples and vacuum 16, and field control circuits 18.

The mechanical controls for samples and vacuum 16 controls the insertion of samples to be analyzed and the maintenance of a vacuum necessary for such analysis and are mechanically connected to the ICR assembly 12 for that purpose. The field control circuits 18 are also connected to the ICR assembly 12 to control the magnetic and electric fields which trap and orbit the ions and the sensing and analyzing circuits 14 are electrically connected to the ICR assembly 12 to provide a readout of information from the analysis.

The ICR mass spectrometer assembly 12 includes an analyzer cell 20, a loss reduction means 21, a main vacuum housing 22 and magnetic poles 24 and 26. The analyzer cell 20 may be any conventional type of one-region ICR analyzer cell and is within or formed as a part of a loss reduction means 21 which reduces leakage of gas molecules from the analyzer cell 20, and in some embodiments, reduces adsorption of gas molecules to surfaces not forming a part of the analysis section of the cell.

The main vacuum housing 22 is largely conventional except insofar as it must permit the entrance and exit of connections to the sensing and analyzing circuits 14, the mechanical controls for sampling and vacuum 16 and the field control circuits 18 that are slightly different in order to accommodate the loss reduction means 21.

The magnetic poles 24 and 26 are positioned on opposite sides of the main vacuum housing 22 and analyzer cell 20 to establish, within the analyzer cell 20, a magnetic field which cooperates with electric fields set up by the field control circuits 18 to control the orbiting of gas ions. The mechanical controls for samples and vacuum 16 control the level of vacuum within the analyzer cell 20 and the main vacuum housing 22 and aid in the insertion of samples.

To prevent large amounts of the sample from being pulled or diverted from the analyzer cell 20 by the fast vacuum pump which is drawing gas from the main vacuum housing 22 or from being adsorbed on surfaces outside the analyzer cell 20, the loss reduction means 21 encloses the analyzer cell 20 and, in some embodiments, includes surfaces which reduce adsorption. The loss reduction means 21 may selectively permit the escape of certain unwanted particles formed by the energy used to create ions of the sample such as products of pyrolysis on the hot filament of the electron gun, particles which are broken away from the collector by the electron beam or unwanted radicals formed from the sample as a result of ionization processes and fragmentation.

In operation of the system 10, the sample is inserted in the analyzer cell 20 where its molecules are ionized and orbited under the influence of the magnetic field while trapped by trapping fields at a pressure of approximately $10^{-7}$ torr. The ions orbiting at certain frequencies are sensed.

To present sample molecules or other particles to the analyzer cell, the sample is inserted through a sample probe directly into the analyzer cell 20 or into a restricted enclosed space near the analyzer cell. The confined space must be sufficiently small to maintain a sufficient concentration of the sample for a sufficient time within the one-region analyzer cell 20.

Sample may be introduced in any conventional manner such as by inserting the sample to be ionized through a sample inlet device which is inserted through a vacuum lock and sealed to the analyzer cell or walls of confining housing and then ionizing the molecules or particles of the sample by means of an electron beam or laser or the like.

To trap the ions within the analyzer cell 20 and orbit them therein, a magnetic field is applied across the analyzer cell 20 by the magnetic poles 24 and 26 to orbit the ions about the central axis of the analyzer cell 20 in planes perpendicular to the direction of the magnetic field. The ions are trapped within the analyzer cell 20 by potential applied to the side and end plates in a conventional manner. Since the analyzer cell 20 is substantially sealed, the sample remains in the analyzer cell for a substantial period of time such as several seconds.

To sense the ions or more correctly the mass-charge ratio of ions, a variable alternating current is applied to excitation plates and varied in frequency. At each of certain frequencies, different ion species with corresponding mass to charge ratios are in resonance with the applied alternating electric field and these resonant electrons are detected. In the preferred embodiment, the detection is by means of receiver plates incorporated into a broad band capacitance bridge but any other detection method may be used with the invention.

The structure of the electrode and sensing plates of the analyzer cell 20, the magnetic poles 24 and 26, the field control circuits 18 and the sensing and analyzing circuits 14 are conventional and not part of this invention in themselves. While many different types of cell structure, poles, sensing and field control circuits may be used, a structure similar to the preferred embodiment is described by Edward B. Ledford, et al, "Exact Mass Measurement in Fourier Transform Mass Spectrometry," *Analytical Chemistry,* Volume 52, pages 463–468.

Figure 2:
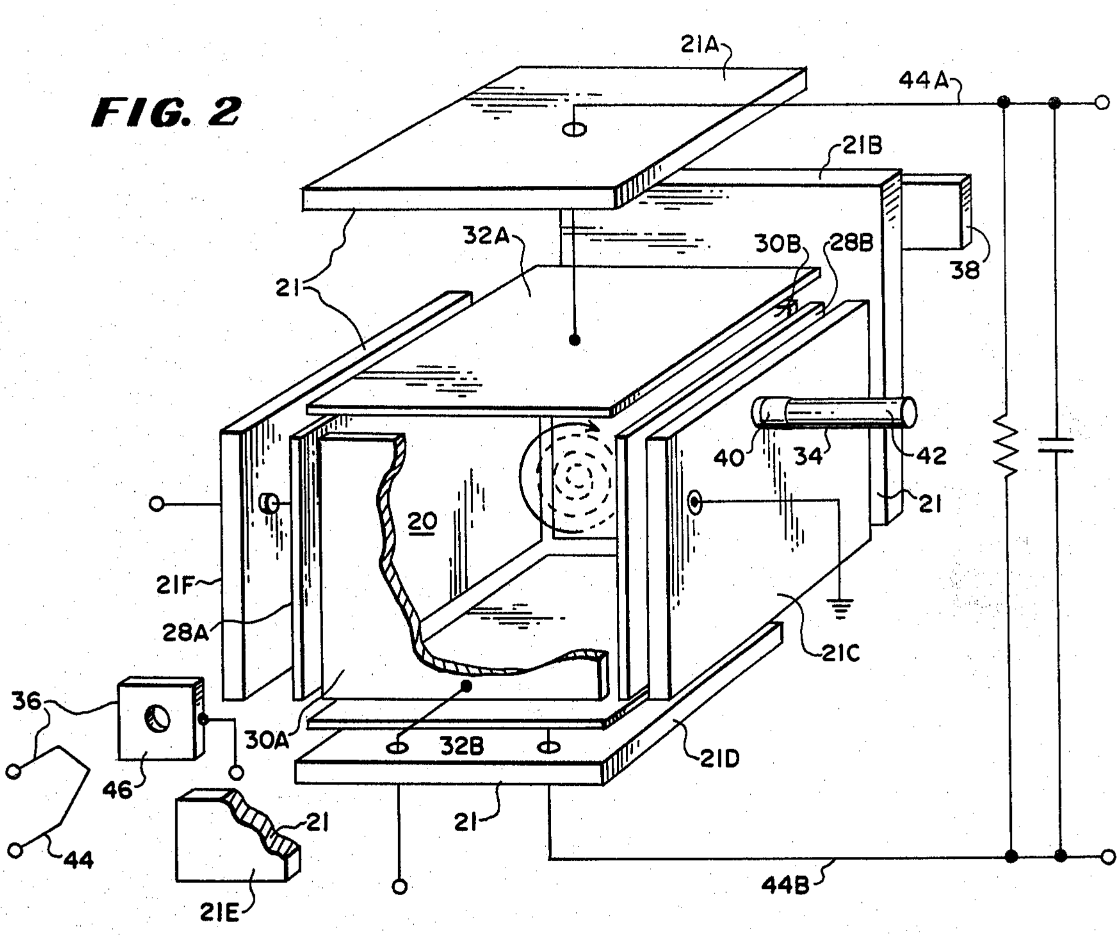
FIG. 2 is a fragmentary simplified, exploded perspective view of a portion of the embodiment of FIG. 1.

In FIG. 2, there is shown a first embodiment of loss reduction means 21 and analyzer cell 20 in a fragmentary simplified, exploded perspective view showing the analyzer cell 20 substantially enclosed by six ceramic plates 21A–21F forming a substantially air-tight enclosure within which the analyzer cell 20 is positioned. The analyzer cell 20 is of the type disclosed in the aforesaid articles. It is approximately one inch square and includes two opposed trapping plates 28A and 28B forming sides, front and rear parallel facing trapping plates 30A and 30B and top and bottom sensing plates 32A and 32B.

To inject a sample mixture within the analyzer cell 20 and ionize it for analysis, the analyzer cell 20 includes a sample inlet means 34 and an electron beam means having an electron gun assembly 36 and a collector plate 38.

The sample inlet means 34 may include aligned apertures in the side electrode trapping plate 28B and the ceramic plate 21C, adapted to receive an inlet port tube 40 which communicates at one end with the interior of the analyzer cell 20 through the aligned apertures of the trapping plate 28B and ceramic plate 21C and at its other end with the interior of an inlet sample tube 42. The inlet sample tube 42 communicates at one end with the interior of the inlet port tube 40 and at its other end with a source of sample, which may be a probe or sample injection valve, or other inlet device, outside the main vacuum housing 22 (shown in FIG. 1, but not in FIG. 2) passing through the walls of the main vacuum housing for that purpose.

To ionize the gas molecules with the analyzer cell 20, the electron gun assembly 36 includes a filament 44 adapted to be heated and thus expel electrons and a grid 46 biased to form a beam of the expelled electrons. The ceramic plate 21E and the front electrode plate 30A include aligned holes for permitting the electron beam formed by the grid 46 to pass into the analyzer cell 20. At the opposite end of the analyzer cell 20, the electrode plate 30B and the ceramic plate 21B include aligned apertures positioned to receive the electron beam and permit it to pass to the collector plate 38.

To provide trapping voltages to the plates 28A, 28B, 30A and 30B, gas tight electrical feedthroughs are provided in the ceramic plates 21F, 21C, 21E and 21B respectively, thus permitting conductors to be attached to the electrodes for the application of potential in a conventional manner such as that described in the aforementioned publication. To sense the ions, conductive plates 32A and 32B are electrically connected to appropriate measuring equipment through the conductors 44A and 44B that pass through the ceramic plates 21A and 21D respectively.

The ceramic plates 21A–21F, together with the electrodes, form an analyzer cell that is substantially gas tight, the only openings being those necessary for the electron beam. The opening for the collector 38 is sealed between the collector and ceramic plate. With this arrangement, the sample life times of 20 seconds have been obtained prior to the loss of sample through the small 1/16 inch openings for the electron gun.

Figure 3:
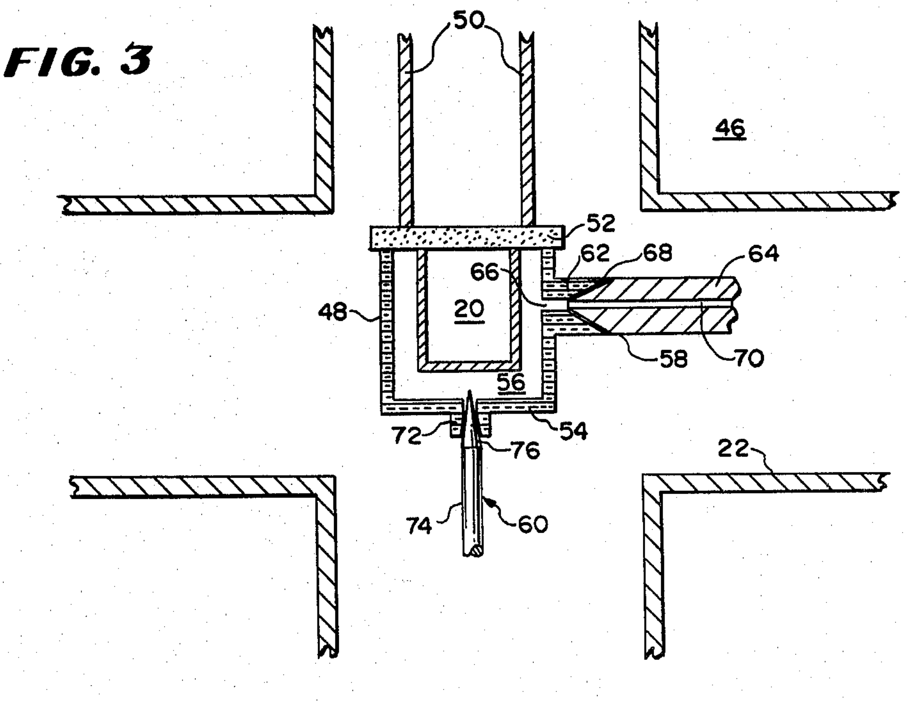
FIG. 3 is an alternate embodiment of a portion of the system of FIG. 1.

In FIG. 3, there is shown a simplified, schematic, sectional view of another embodiment of ICR mass spectrometer assembly 46 having an analyzer cell 20, a loss reduction means 48, and a main vacuum housing 22.

The analyzer cell 20 and the main vacuum housing 22 may be the same as those illustrated in FIGS. 1 and 2. However, they may also include different embodiments known in the art since the invention primarily concerns the loss reduction means 48, its associated apparatus and the way in which it cooperates with the remainder of the ICR mass spectrometer parts. The electrical conductors and the like which are attached to the electrode plates of the analyzer cell 20 have been omitted and are conventional.

As shown in FIG. 3, the analyzer cell 20 and the loss reduction means 48 are supported by any type of suitable support such as those shown at 50 within the main vacuum housing 22. The main vacuum housing 22 communicates with a fast vacuum pump to maintain a high degree of vacuum pressure such as $10^{-8}$ torr. Thus, the high vacuum is maintained within the analyzer cell 20 when it is fully open to the main vacuum housing 22 because it is mounted within the high vacuum housing 22.

The loss reduction means 48 includes as its principal parts: (1) a ceramic insulator block 52; (2) a glass wall section 54 forming an enclosure 56 within it and the insulating block 52; (3) a sample inlet section 58; and (4) a molecular flow conductance tuning sectin 60.

To permit the sample gases to be introduced into the enclosure 56, the sample inlet means 58 includes an outwardly extending female connecting tube 62 and an inwardly extending male connecting tube 64.

The female connecting tube 62 includes a central bore 66 communicating at one end with enclosure 56 and ending at its other end in a conical outwardly extending surface 68. The male connecting tube 64 includes a similar central bore 70 extending along its longitudinal axis terminating at one end of the male connecting tube 64 in an outwardly extending conical surface complimentarily formed with the conical outwardly extending surface 68 to mate therewith, thus enabling the male connecting tube 64 to be inserted into the female connecting tube 62 with the axial bores 66 and 70 aligned to permit sample to pass into the enclosure 56 through them. The male connecting tube 64 extends outside of the main vacuum housing 22 to receive sample with its end extending into the main vacuum housing 22 to permit the insertion of the sample into the enclosure 56.

To control the escape of sample and unwanted particles from the enclosure 56, the molecular flow conductance tuning section 60 includes a female outlet connector tube 72 and a needle valve plunger 74, with the female outlet connector tube 72 including inwardly directed conical surfaces 76 formed complimentarily with the tapered sides of the end of the needle valve plunger 74 and opening into and communicating with the enclosure 56.

The needle valve plunger 74 may be positioned at different depths with the female outlet connector tube 72 to control the size of the opening and thus permit selected escape rates for particles from the enclosure 56.

The main vacuum housing 22 serves as a buffer to provide a constant low pressure for communication with the analyzer cell 20 within the loss reduction means 48 during molecular flow conductance tuning. Thus, the increased pressure within the loss reduction means 48 from the sample is balanced by communication with a volume of relatively constant low pressure. However, the invention contemplates molecular flow conduction tuning or control of loss by other means such as by direct communication of the conductance tuning section 60 with the inlet port of a vacuum pump as well as with a main vacuum housing or the variation of vacuum pressure by the variation of pump speeds or the like.

In operation, the position of the needle valve plunger 74 is adjusted to control the escape of sample and thus to maximize the time of analysis. On the other hand other unwanted particles tend to reduce the vacuum within the enclosure 56, to complicate the analysis.

Some of the particles which increase the pressure with time are particles formed by fragmentation in the analyzer cell 20 of portions of sample by the electron beam. Also the filament of the electron beam forms pyrolysis particles. Beam fragmentation and filament pyrolysis in time increase the pressure within the analyzer cell 20 sufficiently to cause the appearance of possibly unwanted peaks in mass spectra.

To prevent an increase in the pressure within the analyzer cell 20, the needle valve plunger 74 of the loss reduction means 48 is moved to provide communication of the enclosure 56 with the main vacuum housing 22. This communication controls the rate of escape of the products of pyrolysis and beam fragments to maintain a low pressure without causing the rapid escape of sample.

The opening is kept at a point emperically determined to maintain an optimum amount of the sample available for ionization within the analyzer cell 20 without causing an increase in unwanted particles within the analyzer cell 20 large enough to create too many spurious peaks or prevent satisfactory ionization of sample. Moreover, loss of sample by adsorption to the walls of the main vacuum housing 22 or other components is reduced by confining the sample in an area close to the area of analysis with the analyzer cell 20 and using wall surface material to which the sample does not readily adsorb.

Unlike the embodiment of FIG. 2, the embodiment of FIG. 3 permits molecular flow conductance tuning to control the rate of flow of particles from the analyzer cell 20 from sample injection to sample injection and from time to time within the analysis of the same sample. Thus, the needle valve plunger 74 may prevent escape of sample all together during the beginning of analysis immediately after injection of the sample into the enclosure 56 and gradually, as unwanted particles increase in proportion to the unionized sample, increased communication between the enclosure 56 and the main vacuum housing 22 to maintain analysis or may select a size opening suitable for the entire analysis of a molecular species.

Figure 4:
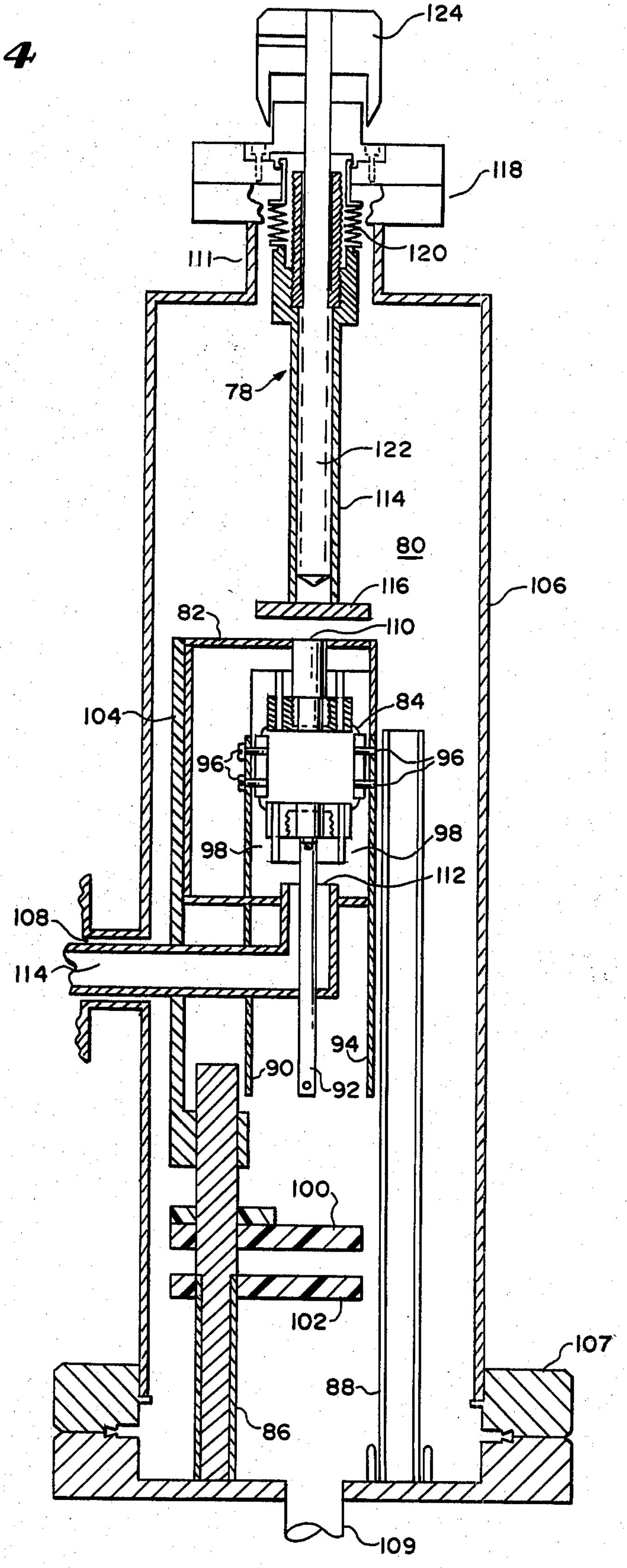
FIG. 4 is a simplified, fragmentary sectional elevational view of the embodiment of FIG. 3.

In FIG. 4, there is shown a simplified, fragmentary, sectional view partly broken away and in elevation of an embodiment shown schematically in FIG. 3 having a conductance tuning section 78, a main vacuum housing 80, a loss reduction means 82, and an analyzer cell assembly 84.

The analyzer cell assembly 84 is mounted with the loss reduction means 82 with both being mounted within the main vacuum housing 80 just as in the more schematic representation of FIG. 3. Similarly, the conductance tuning section 78 is controlled from outside the main vacuum housing 80 to control the loss reduction means 82 within the main vacuum housing 80.

To provide electrical potential to the trapping plates and remove signals from the analyzer cell assembly 84, conductive strips such as those shown at 90, 92 and 94 are connected to the analyzer cell assembly 84 by conductive screws such as those shown at 96. The conductive strips are spaced from the analyzer cell assembly 84 by insulator blocks 98, and extend downwardly for connection by conductors (not shown in FIG. 4) to pin blocks 100 and 102 mounted to the posts 86. Conductors (not shown) extend outside the main vacuum housing 80 from the pin blocks 100 and 102 for connection of the conductive strips to appropriate source of potential.

The loss reduction means 82 is a transparent compartment substantially sealed except for the conductance tuning section 78 to be described hereinafter. It is mounted by a mounting stud 104 which in turn is mounted to the post 86 above pin blocks 100 and 102 and by post 88. The analyzer cell assembly 84 is mounted with the loss reduction means 82 to one of its walls.

To provide a large low pressure area, the main vacuum housing 80 includes a square metal wall 106 forming an enclosure and having a base 107, a vacuum pump neck 109 and a conductance tuning neck 111. The conductance tuning neck 111 includes an opening adapted to receive in one end of the enclosure the conductance tuning section 78 and the vacuum enclosure 106 has an opening in one side 108 for connection to a sample introduction means.

To inject sample into the loss reduction means 82, the loss reduction means 82 has a valve opening 110 forming a part of the conductance tuning section 78 and another opening 112 adapted to communicate with a sample inlet tube 114. The sample inlet tube 114 extends outside the main vacuum housing 80 through a vacuum lock for reception of samples at one end and extends through the walls of the loss reduction means 82 into its interior to provide sample therein.

To permit conductance tuning, the conductance tuning section 78 includes tube 114 extending downwardly adjacent to the opening 110 in the walls of the loss reduction means 82 and having, at its distal end, a flat stop member 116 adapted to abut the top wall of the loss reduction means 82 to form a seal over the opening 110. The other end of the tube 114 extends upwardly to a housing 118 where it is mounted to a sealed bellows 120 and linear motion feedthrough assembly.

To move the tube 114 and stop member 116 downwardly or permit it to be retracted upwardly for conductance tuning, the housing 118 has threaded surfaces mounted within it through which passes a rod member 122 containing external threads and mounted at one end to a rotatable knob 124 for rotation therewith and extending at its other end to a position adjacent to the stop member 116 within the sample inlet tube 114. By rotating the knob 124, the rod member 122 is moved downwardly until it pushes the stop member 116 toward the opening 110 for adjustment of the opening through which particles may be passed from the loss reduction means 82 into the main vacuum housing 80.

In operation, analysis of samples may be performed by inserting samples through the tube 114 into the loss reduction means 82 within the main vacuum housing 80 while the vacuum is maintained at an appropriate pressure such as $10^{-7}$ torr. The escape of unwanted particles through the opening 110 into the lower main vacuum housing 80 is controlled by the knob 124 which may be rotated to a fixed position for the analysis which provides a satisfactory time of analysis. In the alternative, the knob 124 may be set at one position, either manually or automatically, at the beginning of an analysis of a single sample and then changed to permit a greater opening later on in the analysis, as determined emperically.

As can be understood from the above description, the ICR mass spectrometer of this invention has several advantages: (1) it can maintain the lifetime of a small sample for a relatively long period of time, such as 20 seconds; (2) it can be adjusted to balance the accumulation of particles formed by beam fragmentation and filament pyrolysis against the escape of sample by molecular flow conductance tuning; and (3) sample is maintained within the analyzer cell 20 for a sufficiently long time to permit the analysis of mixtures and identification of substances from mixtures to a greater extent than possible heretofore with ICR mass spectrometers.

Although a preferred embodiment of the invention has been described with some particularity, many modifications and variations of the preferred embodiment are possible without deviating from the invention. Therefore, it is to be understood that, within the scope of the appended claims, the invention may be practiced other than as specifically described.

What is claimed is:

1. A method of identifying particles comprising the steps of:

injecting a sample containing particles to be identified into an ICR mass spectrometer within an enclosure that forms a part of a one-region analyzer cell;

maintaining a vacuum in the main vacuum housing that surrounds the one-region analyzer cell;

forming ions of at least a portion of the particles;

orbiting the ions in the region of detection within the analyzer cell;

detecting those ions with predetermined charge to mass ratios; and controlling the loss of sample from the enclosure that forms a part of the one-region analyzer cell to optimize detection of sample ions.

2. The method of claim 1 in which the step of controlling the loss of sample includes the step of controlling the loss of sample by controlling the rate at which the increased pressure caused by the sample within the enclosure is reduced by loss of the sample within the region of detection of the analyzer cell from passing outside the disclosure into the main vacuum housing.

3. The method of claim 2 in which the step of controlling the loss of sample includes the step of permitting escape of sufficient sample through at least one opening in the enclosure to balance the loss of sample against the accumulation of unwanted particles created during analysis.

4. A method according to claim 3 in which the step of controlling the loss of sample includes the step of adjusting the size of the opening, whereby the rate at which sample and unwanted particles are lost may be adjusted to maximize sample-size sensitivity and reduce spurious peaks arising from the accumulation of unwanted particles.

5. A method according to claim 4 in which the step of adjusting the size of the opening includes the step of changing the size of the opening after the process of forming ions has begun.

6. A method according to claim 5 in which the step of adjusting the size of the opening includes the step of adjusting the size of the opening between cycles consisting of injecting sample, forming ionization and detecting at different frequencies.

7. A method according to claim 6 in which the cycles of injecting, ionizing and detecting and adjusting are performed repetitively, with adjustments between each cycle being performed to minimize spurious peaks from the accumulation of unwanted particles.

8. A mass spectrometer comprising:
- a main vacuum housing;
- means for maintaining a vacuum in the main vacuum housing;
- a one-region analyzer cell within the main vacuum housing having an enclosure, a source, an analyzer and a detection region;
- said source, analyzer and detection region being within said enclosure;
- means for injecting samples into the analyzer cell enclosure;
- means for forming ions of at least a portion of samples within the analyzer cell;
- means for orbiting the ions within the analyzer cell in a region in which certain of said ions may be detected in accordance with their charge-mass ratio;
- means for detecting ions having a certain chargemass ratio during ionization; and
- means for controlling the rate at which sample leaves the analyzer cell enclosure, whereas the time span of analysis may be increased.

9. A mass spectrometer according to claim 8 in which the means for controlling the rate at which sample leaves the enclosure includes a means for controlling the decrease in pressure within the analyzer cell enclosure.

10. A mass spectrometer according to claim 9 in which:
- said enclosure at least partially surrounds the analyzer cell; and
- said means for controlling the rate at which sample leaves includes means for controlling the passage of sample from said enclosure to said main vacuum housing.

11. A mass spectrometer according to claim 10 in which said means for controlling the rate includes means for adjusting the size of an opening between said enclosure and said vacuum housing.

12. A mass spectrometer according to claim 11 in which said means for controlling the rate includes means for changing the size of said opening between the time said sample is injected and the termination of detection of ions, whereby unwanted particles are reduced after analysis starts.

13. A mass spectrometer according to claim 12 in which said means for controlling the rate includes means for adjusting the size of an opening after analysis.

14. A mass spectrometer according to claim 13 in which aid means for adjusting the size of an opening includes means for automatically adjusting the size of an opening between cycles of injecting a sample, ionizing the sample and analyzing the ions of the sample.

15. A method of mass spectrometry according to claim 14 in which the method of controlling the rate includes means for repetitively controlling the size of opening within a plurality of repetitive cycles of sample injection.

16. The method of claim 1 in which the step of controlling the loss of sample includes the step of permitting escape of sufficient sample through at least one opening in the enclosure to balance the loss of sample against the accumulation of unwanted particles created during analysis.

17. A method according to claim 16 in which the step of controlling the loss of sample includes the step of adjusting the size of the opening, whereby the rate at which sample and unwanted particles are lost may be adjusted to maximize sample-size sensitivity and reduce spurious peaks arising from the accumulation of unwanted particles.

18. A method according to claim 17 in which the step of adjusting the size of the opening includes the step of changing the size of the opening after the process of forming ions has begun.

19. A method according to claim 18 in which the step of adjusting the size of the opening includes the step of adjusting the size of the opening between cycles consisting of injecting sample, forming ionization and detecting at different frequencies.

20. A method according to claim 19 in which the cycles of injecting, ionizing and detecting and adjusting are performed repetitively, with adjustments between each cycle being performed to minimize spurious peaks from the accumulation of unwanted particles.

21. A method according to claim 16 in which the step of controlling the loss of sample includes the step of adjusting the size of the opening, whereby the rate at which sample and unwanted particles are lost may be adjusted to maximize sample-size sensitivity and reduce spurious peaks arising from the accumulation of unwanted particles.

22. A method according to claim 21 in which the step of adjusting the size of the opening includes the step of changing the size of the opening after the process of forming ions has begun.

23. A method according to claim 22 in which the step of adjusting the size of the opening includes the step of adjusting the size of the opening between cycles consisting of injecting sample, forming ionization and detecting at different frequencies.

24. A method according to claim 23 in which the cycles of injecting, ionizing and detecting and adjusting are performed repetitively, with adjustments between each cycle being performed to minimize spurious peaks from the accumulation of unwanted particles.

25. A mass spectrometer according to claim 8 in which:
- said enclosure at least partially surrounds analyzer cell; and
- said means for controlling the rate at which sample leaves includes means for controlling the passage of sample from said enclosure to said main vacuum housing.

26. A mass spectrometer according to claim 25 in which said means for controlling the rate includes means for adjusting the size of an opening between said enclosure and said vacuum housing.

27. A mass spectrometer according to claim 26 in which said means for controlling the rate includes means for changing the size of said opening between the time said sample is injected and the termination of detection of ions, whereby unwanted particles are reduced after analysis starts.

28. A mass spectrometer according to claim 27 in which said means for controlling the rate includes means for adjusting the size of an opening after analysis.

29. A mass spectrometer according to claim 28 in which said means for adjusting the size of an opening includes means for automatically adjusting the size of an opening between cycles of injecting a sample, ionizing the sample and analyzing the ions of the sample.

30. A method of mass spectrometry according to claim 29 in which the method of controlling the rate includes means for repetitively controlling the size of opening within a plurality of repetitive cycles of sample injection.

31. A mass spectrometer according to claim 8 in which said means for controlling the rate includes means for adjusting the size of an opening between said enclosure and said vacuum housing.

32. A mass spectrometer according to claim 31 in which said means for controlling includes means for changing the size of said opening between the time said sample is injected and the termination of detection of ions, whereby unwanted particles are reduced after analysis starts.

33. A mass spectrometer according to claim 32 in which said means for adjusting the size of an opening includes means for automatically adjusting the size of an opening between cycles of injecting a sample, ionizing the sample and analyzing the ions of the sample.

* * * * *

UNITED STATES PATENT AND TRADEMARK OFFICE
CERTIFICATE OF CORRECTION

PATENT NO. : 4,315,149

DATED : February 9, 1982

INVENTOR(S) : Edward B. Ledford

It is certified that error appears in the above—identified patent and that said Letters Patent is hereby corrected as shown below:

Column 5, line 43, change "sectin" to --section--.

Column 10, line 5, change "aid" to --said--.

Signed and Sealed this

*First* Day of *June 1982*

[SEAL]

*Attest:*

GERALD J. MOSSINGHOFF

*Attesting Officer* *Commissioner of Patents and Trademarks*